Patented Nov. 1, 1938

2,135,399

UNITED STATES PATENT OFFICE 2,135,399

ABSORBABLE INSULATING ANIMAL MEMBRANE AND SUTURES AND PROCESS OF MAKING SAME

Herbert L. Johnson, Boston, Mass.

No Drawing. Application April 25, 1936, Serial No. 76,467

12 Claims. (Cl. 128—335.5)

This invention relates to surgery and more particularly to skeletal surgery such as tendon and nerve repair, joint operations and the like, and the principal object of the invention is to provide a novel strand or membrane and process of making same, said strand or membrane being formed of amniotic and/or allantoic foetal membrane, and is used to prevent adhesions between animal body tissues and is also used as a very fine grade of suture material.

Of these foetal membranes, the amniotic is the foetal tissue which forms the sac in which the foetus rests before birth, while allantoic is the tissue of the outside sac-like appendage surrounding the amniotic sac. The amniotic sac contains a fluid called amniotic fluid, the use of which fluid as a therapeutic agent, for promoting the healing of animal body tissues and for preventing abdominal adhesions and peritonitis in surgical operations, forms the subject matter of my U. S. Letters Patent No. 1,696,958, issued January 1, 1929.

A further object of the invention is to provide a novel process for commercially preparing this membrane in the preparation of suture material, both plain and chromicized.

The present application is a continuation-in-part of my co-pending application Ser. No. 62,229, filed February 3, 1936.

I will explain the invention to enable others to adopt and use the same, and will summarize in the claims the essential features of the invention for which protection is desired.

The foetal membrane, amniotic or allantoic, which I prefer to use is procured at slaughter houses from the uterus of cows two to seven months pregnant. Each cow from which a uterus is taken must have previously passed government inspection during the process of slaughtering and butchering by Federal veterinary surgeons stationed in the killing rooms of slaughter houses.

In the cow's uterus are three distinct membranes, the amnion, the allantois, and the chorion. Of these foetal membranes, the amnion is the firmest. The allantois is invested with the chorion. The chorion may be stripped off the allantois leaving the latter smooth and clean and suitable for the same purposes described in my application Ser. No. 62,229. The allantois is better qualified for suture material because of its finer texture than the amnion; and is moreover much more abundant, and is avascular.

The foetal membrane selected for use is separated from the other tissues of the gravid uterus by anatomical dissection. This dissection may be carried out at the slaughter house, or the whole uteri may be transported to the laboratory under conditions of suitable refrigeration. If dissection is done at the slaughter house, the membrane is placed in jars containing a suitable antiseptic such as a 1% solution of thymol in normal salt solution, to preserve sterility during transportation. If dissection is done at the laboratory, no such solution is necessary as the membrane is practically sterile when removed from the uterus.

After the membrane is removed from the uterus at the laboratory, or from the jars containing the thymol solution, it is stretched out flat upon drying racks and thoroughly washed with normal salt solution. It is then allowed to dry on the racks upon which it is stretched. Drying may be hastened by heat and reduced atmospheric pressure. When the membrane is thoroughly dry, it is placed in an ether bath for one week for the purpose of removing fat. During this process, it remains stretched upon the drying racks.

When the membrane is removed from the ether bath at the end of one week, it is dried and sorted. The heavier pieces are selected for chromicizing and will be called "chromicized foetal membrane" while the lighter pieces are to remain plain and will be called "plain foetal membrane". The finer membranes taken from uteri two to four months pregnant and prepared "plain" are especially intended for nerve, tendon, brain and peritoneal surgery. The heavier pieces taken from uteri in more advanced stages of pregnancy and prepared by chromicizing are especially intended more for bone surgery.

Those pieces selected for chromicizing are placed in a chromic acid bath for twenty-four hours without being removed from the rack on which they were originally pinned. The strength of the chromic acid solution is preferably in the proportion of one gram of chromic acid to each gallon of water. After the membrane has remained in the chromic acid solution for twenty-four hours, copper sulphate crystals (three-fourths of an ounce by volume to each gallon of chromic acid solution) may be added to the solution for the purpose of coloring. The membrane is allowed to stand in the colored solution for an additional two hours. On removing the membrane from the colored chromic acid solution, it is allowed to dry on the rack on which it was originally pinned.

After drying is complete, both the plain and chromicized membranes are cut into sizes suitable for commercial distribution. Each piece is rolled lightly upon itself and placed in a glass tube similar to that now used for the commercial distribution of catgut. The sizes in which the membrane may be distributed commercially, may vary from about two inches by one inch to six inch squares. At this stage, both the plain and chromicized membranes, now in the tubes, while unsealed are placed in a hydrocarbon solution of "Cumene" or "Cumol" and heated to and maintained at a sterilizing temperature of 180° centigrade for about one hour. On removal from the sterilizer, the tubes are placed upside down on a tray for the purpose of draining off the hydrocarbon solution and in this position are placed in a bath containing one-tenth of one percent of potassium mercuric iodide in alcohol. After rinsing in the alcoholic solution of potassium mercuric iodide, the tubes are half filled with 95 per cent grain alcohol, and then sealed by a Bunsen burner flame. The whole process from the sterilizer to the final sealing of the tube must be carried out under conditions of rigid asepsis.

My novel membrane, both the amniotic and allantoic, may be used in the treatment of injuries to or operations upon the tendons, nerves, joints, brain, peritoneal cavity and such other tissues as are deprived of their normal relation to each other, especially insofar as the surface which prevents them from adhering to surrounding structures has been destroyed. This membrane may be used not only in the locations mentioned above but anywhere in the human or animal body where a slowly absorbable surface protection is required during the process of repair. By the use of properly cured amniotic or allantoic membrane, I supply for these denuded surfaces a temporary covering which is sterile and slowly but completely absorbable in the same manner that catgut is absorbed.

My foetal membrane furthermore may be used in place of, or in conjunction with, the amniotic fluid prepared as described in my U. S. Letters Patent No. 1,696,958 for the prevention of body adhesions.

Furthermore, my foetal membrane, both amniotic and allantoic, may be formed into very fine grades of suture material, utilizing the steps of twisting or spinning strips of the membrane now employed in making catgut sutures of sheep's intestines.

I claim:

1. A therapeutic material for use in promoting repair, with low local irritation, of animal body tissues, comprising foetal membrane of the group consisting of the amniotic and allantoic membranes.

2. Sutures, patches, ribbons, and the like of absorbable membrane for use in protecting injured animal body tissues during repair, comprising amniotic membrane.

3. Sutures, patches, ribbons, and the like of absorbable membrane for use in protecting injured animal body tissues during repair, comprising cleaned and sterilized amniotic membrane.

4. Sutures, patches, ribbons, and the like of absorbable membrane for use in protecting injured animal body tissues during repair, comprising cured and sterilized amniotic membrane.

5. Sutures, patches, ribbons, and the like of absorbable membrane for use in protecting injured animal body tissues during repair, comprising chromicized and sterilized amniotic membrane.

6. Sutures, patches, ribbons, and the like of absorbable membrane for use in protecting injured animal body tissues during repair, comprising allantoic membrane.

7. Sutures, patches, ribbons, and the like of absorbable membrane for use in protecting injured animal body tissues during repair, comprising cleaned and sterilized allantoic membrane.

8. Sutures, patches, ribbons, and the like of absorbable membrane for use in protecting injured animal body tissues during repair, comprising cured and sterilized allantoic membrane.

9. Sutures, patches, ribbons, and the like of absorbable membrane for use in protecting injured animal body tissues during repair, comprising chromicized and sterilized allantoic membrane.

10. A therapeutic material for use in promoting repair, with low local irritation, of animal body tissues, comprising amniotic and allantoic membranes.

11. The process of preparing an absorbable membrane for use in promoting repair of animal body tissues, with low local irritability, comprising separating from the remaining tissues of a gravid uterus, a membrane of the group consisting of amniotic and allantoic membranes, and cleaning and sterilizing said membrane.

12. The process of preparing an absorbable membrane for use in promoting repair of animal body tissues with low local irritability, comprising separating from the remaining tissues of a gravid uterus, a membrane of the group consisting of amniotic and allantoic membranes, and cleaning, curing and sterilizing said membrane.

HERBERT L. JOHNSON.